April 21, 1959   L. T. SZADY   2,883,023
SPRAG ASSEMBLY FOR ONE-WAY CLUTCHES
Filed Dec. 7, 1953

INVENTOR.
LEOPOLD T. SZADY
BY
*Whittemore Hulbert & Belknap*
ATTORNEYS

United States Patent Office 2,883,023
Patented Apr. 21, 1959

2,883,023

SPRAG ASSEMBLY FOR ONE-WAY CLUTCHES

Leopold T. Szady, Grosse Pointe Woods, Mich., assignor to Formsprag Company, Van Dyke, Mich., a corporation of Michigan Application December 7, 1953, Serial No. 396,405

2 Claims. (Cl. 192—45.1)

The invention relates to sprag assembly units for one-way clutches of the type including spaced coaxial raceways on relatively rotatable members for receiving the sprags therebetween. The present application for patent is a continuation-in-part of my pending application, Serial No. 338,408, filed February 24, 1953.

It is the object of the invention to obtain a unit which in addition to carrying all of the sprags is provided with means operable when the assembly is inserted between the raceways of the clutch for holding the same in concentric relation to each other. The invention further consists in a construction having a plurality of rollers distributed about the unit intermediate sprags thereof and retained therewith, said rollers forming spacers for the raceways which hold the same in concentric relation to each other.

With these objects in view, the invention consists in the construction as hereinafter set forth.

In my former application above referred to the sprag assembly unit includes a ring member of a diameter to be insertable between the coaxial raceways of the clutch adjacent to one thereof, a series of sprags, each of which has a channel in an end portion thereof for engaging said ring, and means for retaining the sprags in such engagement, preferably a garter spring engaging notches in the opposite ends of the sprags and also forming an energizing means. This construction has the advantage that all of the sprags are held in operative relation to each other to be inserted into or removed from the clutch as a unit. The energizing means for the sprags also forms a part of the unit so that when the assembly is engaged with the race members of the clutch, it is in condition for instant operation.

With the construction just described, while the unit is engageable between the raceways, there is nothing to insure that these raceways are held concentric with each other. I have, therefore, devised an improved sprag assembly unit which insures concentricity of the race members when the unit is engaged therewith, the construction being as follows:

A and B are the concentric raceways of a one-way clutch and C is my improved sprag assembly unit for engagement therewith. The unit comprises a ring member D which is of a diameter to be insertable between the raceways A and B and preferably adjacent to one thereof, such as the raceway A. E are the sprags, which may be of any suitable construction, but as shown are of the form also specifically illustrated in my former application, Serial No. 338,408, which is of a substantially D-shaped cross-sectional contour. The opposite ends E′ and E² of the sprag radially of the clutch are cammed and are eccentric to each other. A side E³ extends in a generally radial direction while the opposite side E⁴ is V-shaped with a rounded nose portion E⁵ in the center thereof. Each sprag has a channel F in the cammed portion E′ thereof, preferably midway between the axial ends of the sprag, and is further provided with a channel G opposite the channel F in the cammed portion E². The channel F is adapted to engage the ring D, while the channel G is adapted to receive the retaining means, preferably a resilient annulus H formed of a helical coil of resilient wire and in cooperation with a cammed bottom face of the channel G constituting an energizing garter spring for the sprags. It also serves to retain the sprags in their engagement with the ring F.

Figure 1:
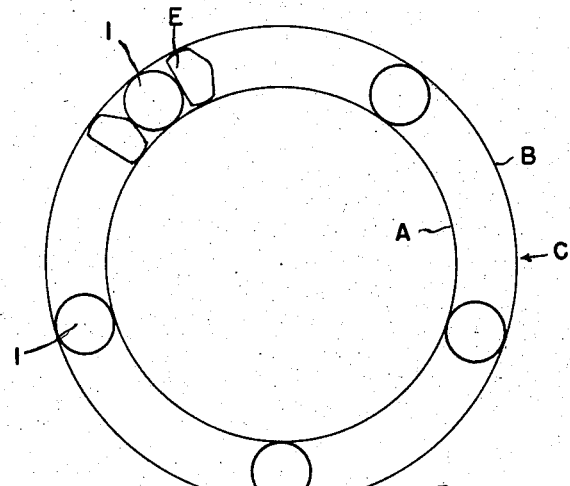
Fig. 1 is an elevation of the unit.
Figure 2:
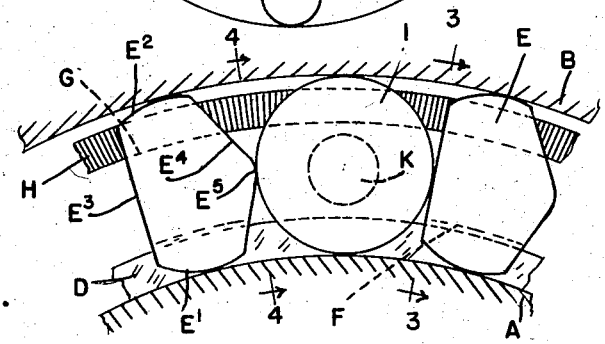
Fig. 2 is an enlarged section through a portion of the unit parallel to its plane of rotation and showing the same in engagement with the spaced raceways of a one-way clutch.
Figure 3:
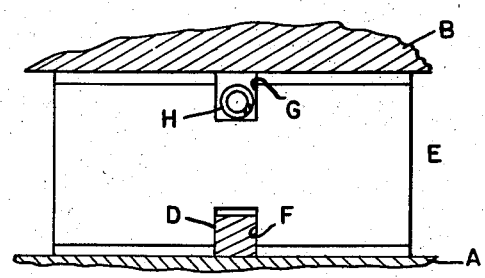
Fig. 3 is a cross-section on line 3—3, Fig. 2.
Figure 4:
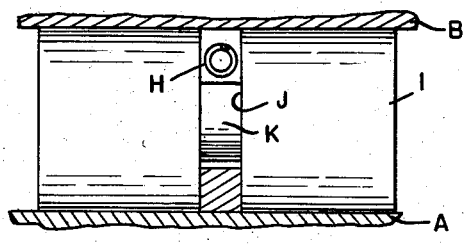
Fig. 4 is a cross-section on line 4—4, Fig. 2.

Distributed around the unit are rollers I which are of a diameter to form spacers between the raceways to hold the same in concentric relation. As shown in Fig. 1 there are five of these rollers at equally spaced intervals but the number may be larger or smaller. The rollers are placed between adjacent sprags and to permit of doing so, each roller has an annular channel J extending around the same centrally between the axial ends thereof and registering with the channels F and G of the sprags. The channel J is preferably of a depth to space the circular connecting portion K from both the ring F and the annulus H when the unit is between the race members. This will leave the rollers free to revolve in contact with the raceways when the clutch is disengaged and as above stated will hold said raceways concentric. The rollers also leave the adjacent sprags free to turn into or out of frictional engagement with the raceways in the operation of the clutch.

The construction as above described does not materially add to the cost of the unit, and by holding the raceways always concentric with each other insures the operativeness of the clutch.

What I claim as my invention is:

1. A sprag assembly for one-way clutches of the type including spaced concentric annular raceways for receiving a series of sprags therebetween; said assembly comprising a ring member having side walls insertable between said raceways adjacent to one thereof and in engagement therewith, a series of sprags, each having a channel in one raceway engaging face thereof, the side walls of the said channel engaging the side walls of the ring, a second channel in the opposite raceway engaging face of the sprags, a plurality of rollers distributed about said ring interposed between selected sprags of the series, each roller having an annular channel therein, the side walls of the said annular channel engaging the side walls of the ring, said rollers forming spacers for holding the raceways concentric and together with said sprags forming a full complement, with only working clearance between adjacent members thereof, and means peripherally engageable in the second channels of all the sprags and said annular channels of the rollers for retaining all on said ring member.

2. The construction as in claim 1 in which the annular channel in each of said rollers is of a depth to clear both said ring member and said retaining means so that the roller is free to rotate when in engagement with said raceways.

References Cited in the file of this patent

UNITED STATES PATENTS

| | | |
|---|---|---|
| 1,596,599 | De Lavaud | Aug. 17, 1926 |
| 2,028,876 | Lotts | Jan. 28, 1938 |
| 2,570,290 | Turner | Oct. 9, 1951 |
| 2,598,864 | Turner | June 3, 1952 |
| 2,614,669 | Dodge | Oct. 21, 1952 |
| 2,748,912 | Banker | June 5, 1956 |